United States Patent [19]

Bergqvist

[11] Patent Number: 5,021,108
[45] Date of Patent: Jun. 4, 1991

[54] METHOD AND APPARATUS FOR MANUFACTURING A FOAMED PLASTIC LAMINATED PANEL

[75] Inventor: Tonny E. Bergqvist, Cotton Tree, Australia

[73] Assignee: Coral Irene Bergqvist, Queenland, Australia

[21] Appl. No.: 334,955

[22] PCT Filed: Jul. 22, 1988

[86] PCT No.: PCT/AU88/00266
§ 371 Date: May 22, 1989
§ 102(e) Date: May 22, 1989

[87] PCT Pub. No.: WO89/00496
PCT Pub. Date: Jan. 26, 1989

[30] Foreign Application Priority Data

Jul. 22, 1987 [AU] Australia .................... PI3255

[51] Int. Cl.⁵ .............................................. B32B 5/20
[52] U.S. Cl. .................................... 156/79; 52/309.7; 264/46.5; 264/46.7; 425/817 R; 156/245; 428/309.9; 428/319.1

[58] Field of Search .................. 52/309.7, 309.11; 156/78, 79, 583.8, 245; 264/46.5, 46.7; 425/817 R; 428/309.9, 319.1

[56] References Cited

U.S. PATENT DOCUMENTS

| | | | |
|---|---|---|---|
| 2,576,073 | 11/1951 | Kropa et al. | 52/309.7 X |
| 4,012,186 | 3/1977 | Ramazzotti et al. | 264/46.5 X |
| 4,793,793 | 12/1988 | Swenson et al. | 425/817 R X |
| 4,955,800 | 9/1990 | Rothwell et al. | 425/817 R X |

Primary Examiner—Michael W. Ball
Assistant Examiner—Mark A. Osele
Attorney, Agent, or Firm—Sughrue, Mion, Zinn Macpeak & Seas

[57] ABSTRACT

An apparatus for manufacture of laminated panels having a foamed plastics core material includes an inclined press having a fixed platen surface and a movable platen surface hinged adjacent its lower edge. Panel thickness is adjustable by a mechanism which moves the hinge pivot relative to fixed platen surface. The platen surfaces are clamped at their upper edges by spaced clamps operable by lever and crank assemblies. A retractable seal spacer has liquid plastics injection nozzles and gas venting tubes in fluid communication with a hollow cavity in the press.

11 Claims, 9 Drawing Sheets

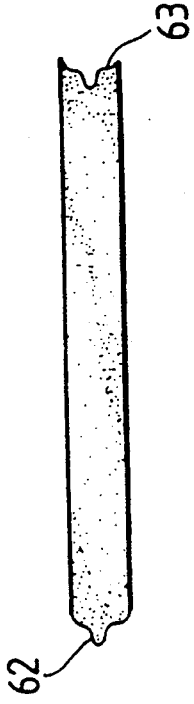
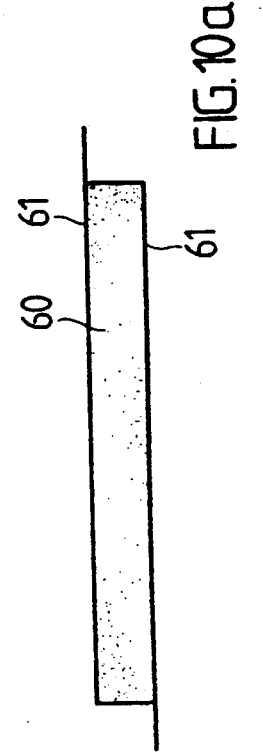
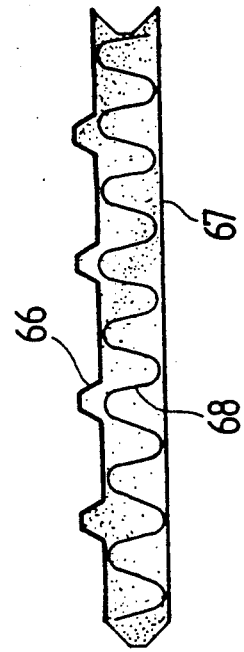
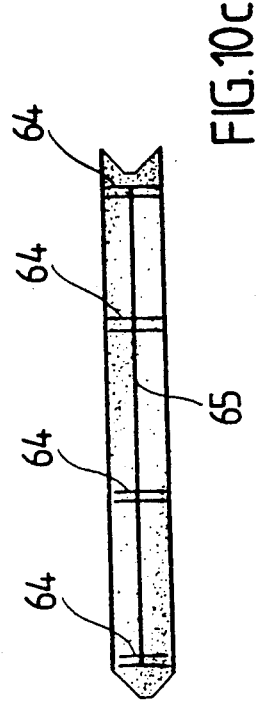
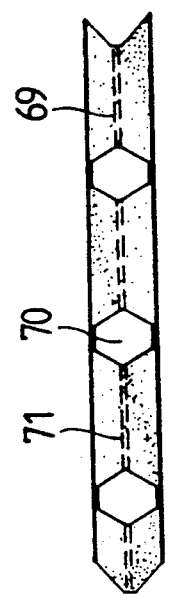

METHOD AND APPARATUS FOR MANUFACTURING A FOAMED PLASTIC LAMINATED PANEL

This invention is concerned with the manufacture of laminated panels having a core of cellular plastics material and an apparatus for the manufacture of such panels.

Throughout the specification reference is made by example to panels having a core formed from a liquid foamable polyurethane resin. It should be understood however that the invention concerns any liquid foamable plastics material capable of solidifying to form a stable core material to which one or more outer skins are adhered.

Lightweight panels having cellular plastics cores sandwiched between durable outer skins of sheet plastics, metal, timber cementitious materials and the like have found favour as thermal insulation members in cold rooms, cold storage warehouses and building structures located in adverse climates. Typically such insulating panels comprise a core of open or closed cell polystyrene or polyurethane foam.

Polystyrene foam possesses a number of disadvantages as an insulating material. In terms of thermal efficiency it is inferior to polyurethane foam as approximately 50% greater panel thicknesses are required with polystyrene foam panels for equivalent thermal insulating qualities.

When open cell polystyrene foam panels are used for say a cold room or freezer, the panels absorb water and ultimately the panels become effectively a solid block of ice. This substantially reduces the thermal efficiency of the panels and due to the weight increase, substantially stronger support structures are required. Another disadvantage is that the outer surface of the panel exposed to ambient conditions is constantly wet with melted ice and this can lead to decay or corrosion in steel support structures and steel or timber panel skins.

Of recent times a closed cell polystyrene foam has become available but it is substantially more costly than prior art open cell polystyrene foam. While closed cell foams substantially alleviate the problem of water absorption, thicker panels are still required.

Polystyrene foam cored panels are costly to manufacture as the core slabs are cut from large slab stock and then adhered to the outer skins in a press. The high capital costs associated with large presses tends to limit the size of polystyrene foam cored panels.

Polyurethane foam cored panels have found increasingly greater acceptance as insulating panels due to ease of manufacture, greater strength and superior insulating qualities.

Generally speaking polyurethane foam cored panels are formed by injecting between spaced skin members an admixture of a polyether resin, a di-isocyanate material and an additional blowing agent such as Freon 11 or Freon 12. The opposed skin members are held either vertically or horizontally in a press and are spaced by removable timber or steel members located about the periphery of the skin members The peripheral members act to form mould closures to define an enclosed space between the skins. Alternatively, non-removable peripheral and intermediate members made from polyurethane foam may be employed to act as spacers for the skins and to act as mould closures.

Although high quality foam cored panels having a variety of skin finishes may be produced in this manner, there are nevertheless some disadvantageous aspects associated with the manufacture of such panels.

Polyurethane foam cored panels produced by prior art methods are generally limited in length to about, say, 10 metres. This is due partly to the high capital cost in manufacture of a press capable of withstanding an internal pressure of 5 to 6 p.s.i. as the foam undergoes expansion. The other major limiting factor is that transportation of panels in excess of 10 metres in length is difficult, costly and often prevented by traffic authorities.

Accordingly it is an aim of the present invention to overcome or alleviate the problems associated with prior art apparatus and processes in the manufacture of polyurethane foam cored panels.

According to one aspect of the invention there is provided an apparatus for manufacture of foamed plastics laminated panels having at least one outer skin member, said apparatus comprising a press member including a pair of spaced relatively movable platen surfaces;

adjustment means to adjust spacing between said platen surfaces;

hinge means associated with at least one of said platen surfaces adjacent a longitudinal edge thereof;

clamp means to retain, in use, said platen surfaces in a predetermined spaced relationship;

sealing members locatable, in use, about and between peripheral opposed edges of said platen surfaces to define a hollow cavity between said opposed platen surfaces when said clamp means is actuated;

support means to support an outer skin member in a predetermined position against at least one of said opposed platen surfaces; and port means to introduce into said cavity a liquid foamable plastics material.

Preferably said press member is adapted for end abutment with one or more adjacent press members to form laminated panels of a predetermined length greater than the length of platen surface of an individual press member.

The press member may include means to support said press member in an upright position. Preferably means are provided to support said press member in an inclined position.

The spaced relatively movable platen surfaces may comprise separately hinged platen members but preferably said press member comprises a fixed platen surface and a hinged platen surface.

The adjustment means may comprise any suitable means to selectively adjust spacing between opposed platen surfaces. Suitably said adjustment means comprises means to move hinge brackets to which a platen member is hingedly attached. The adjustment means may comprise a mechanical adjustment means actuated by mechanical electrical or fluid powered actuating means.

The clamp means may comprise a plurality of clamp members located along one or more peripheral edges of said platen surfaces.

The clamp means may comprise a plurality of clamp members operable individually, in groups or collectively.

The support means to support an outer skin member against a platen surface may comprise an abutment located adjacent a lower edge of either or both opposed platen surfaces. Alternatively said support means may comprise one or more of said sealing members adapted to locate an outer skin member in a predetermined position against a platen surface.

If required, said support means may comprise an evacuated air space between a platen surface and an outer skin member.

If required the support means may comprise means to evacuate an air space between said platen surface and an adjacent surface of said outer skin member.

Preferably a platen surface associated with a platen member includes means to selectively control the temperature of said platen surface. Preferably the modular press system according to the invention comprises a plurality of transportable press members.

According to another aspect of the invention there is provided a mobile plant for manufacture of foamed plastics laminated panels having a core of foamed plastics materials sandwiched between opposing layers of outer skin material, said mobile plant comprising a plurality of transportable press members as hereinbefore described with reference to the invention;

a mobile transport vehicle including storage tanks for liquid plastics materials and foaming agents, said vehicle including mixing and injection apparatus for injecting a foamable plastics material into said press members; and a mobile transport vehicle including rolls of a web-like outer skin material and, if required, means to profile at least one outer skin material.

According to yet another aspect of the invention there is provided a structural member comprising:

a foamed plastics cored panel having opposed outer skins of a cladding material; and structural reinforcing members located within a core of said panel and extending substantially between opposed inwardly facing surfaces of said outer skins.

Suitably said structural reinforcing members extend longitudinally of said panel. The structural members may comprise any suitable reinforcing means. Suitably the reinforcing means may comprise pre-stressing steel rods or cables, fabricated steel trusses, deformed steel mesh panels, profiled steel sheets or the like or any combination thereof.

In order that the invention may be more fully understood reference is now made to a preferred embodiment described with reference to the accompanying drawings in which.

Figure 1:
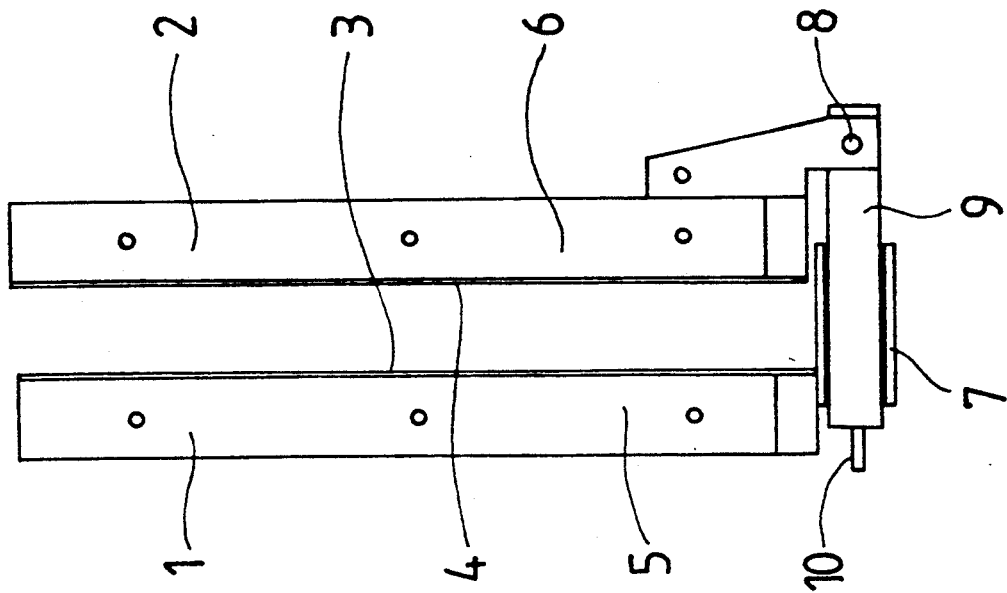
FIG. 1 shows a side elevation of a press apparatus in a first closed position.
Figure 2:
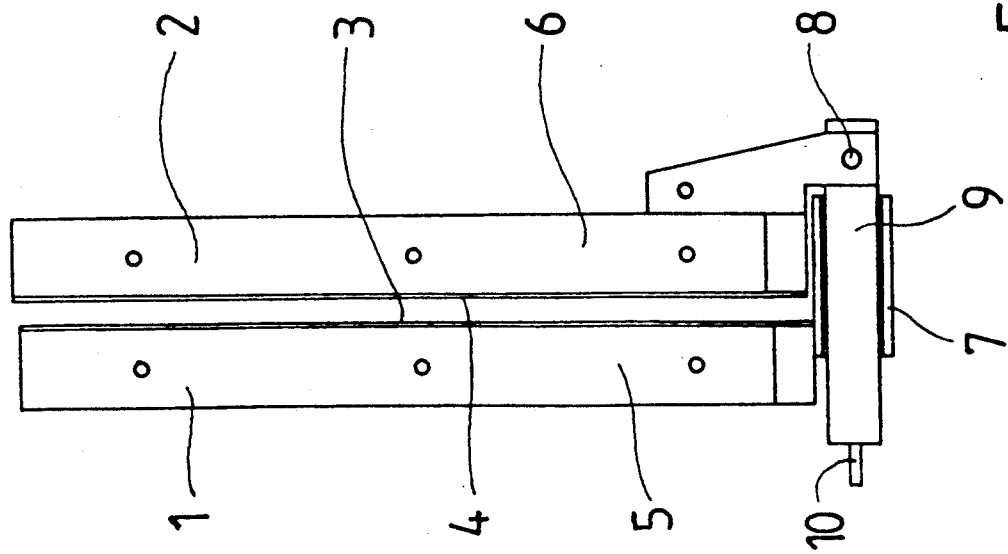
FIG. 2 shows the arrangement of FIG 1 in a second closed position.
Figure 4:
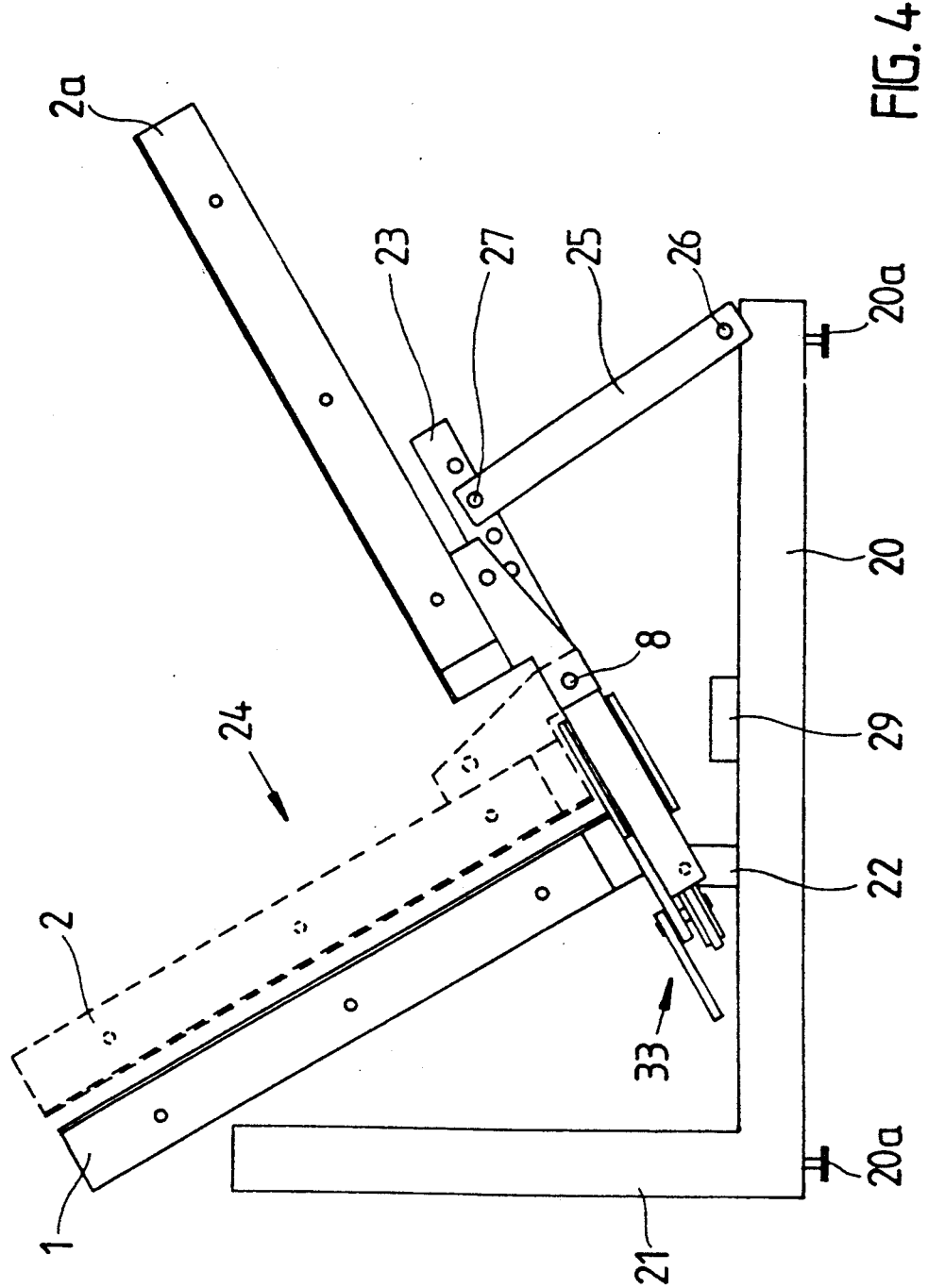
Figure 5:
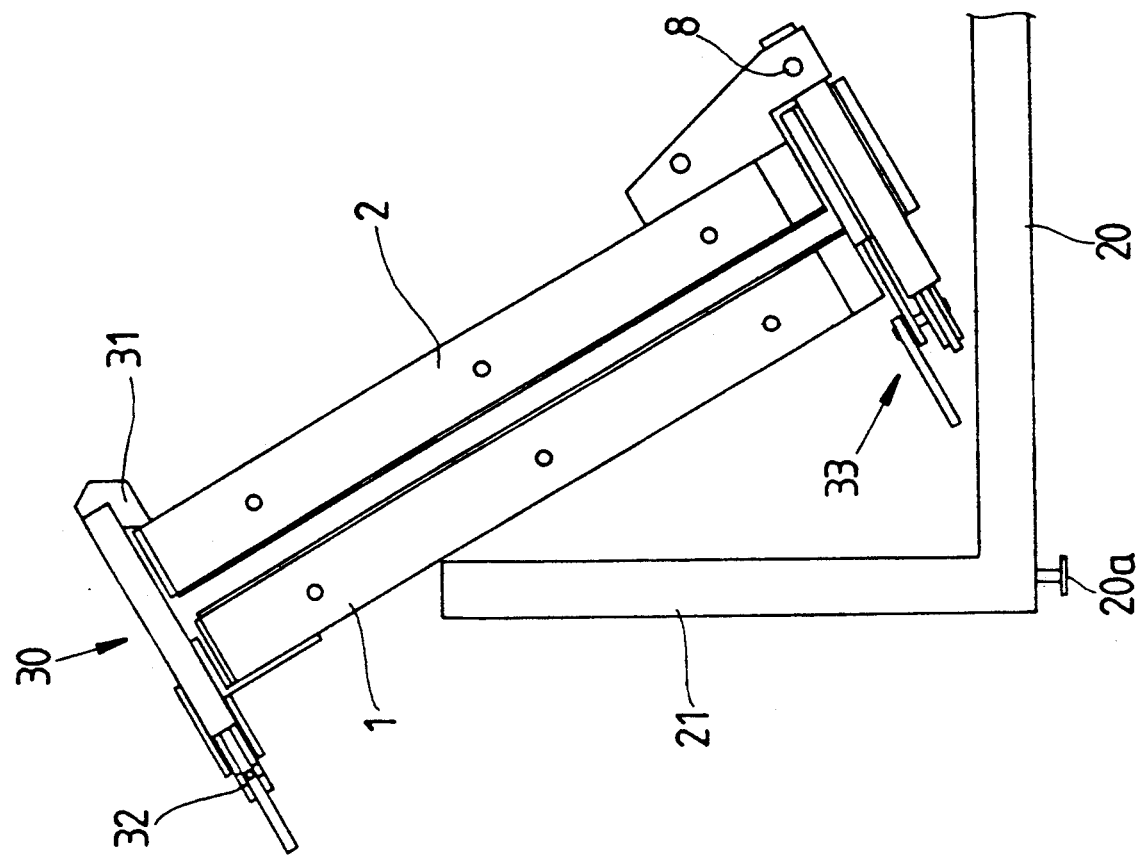
Figure 6:
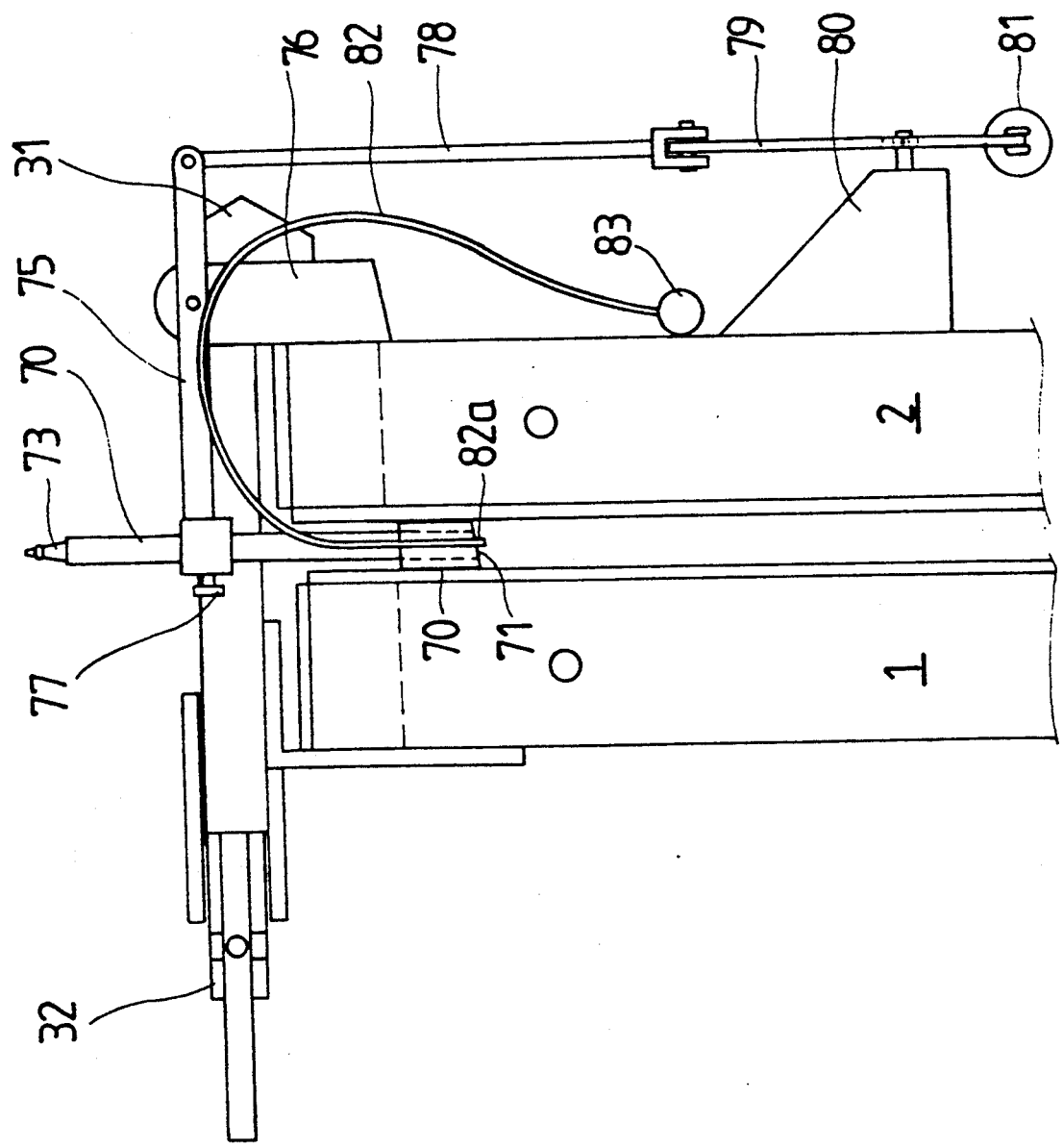
Figure 7:
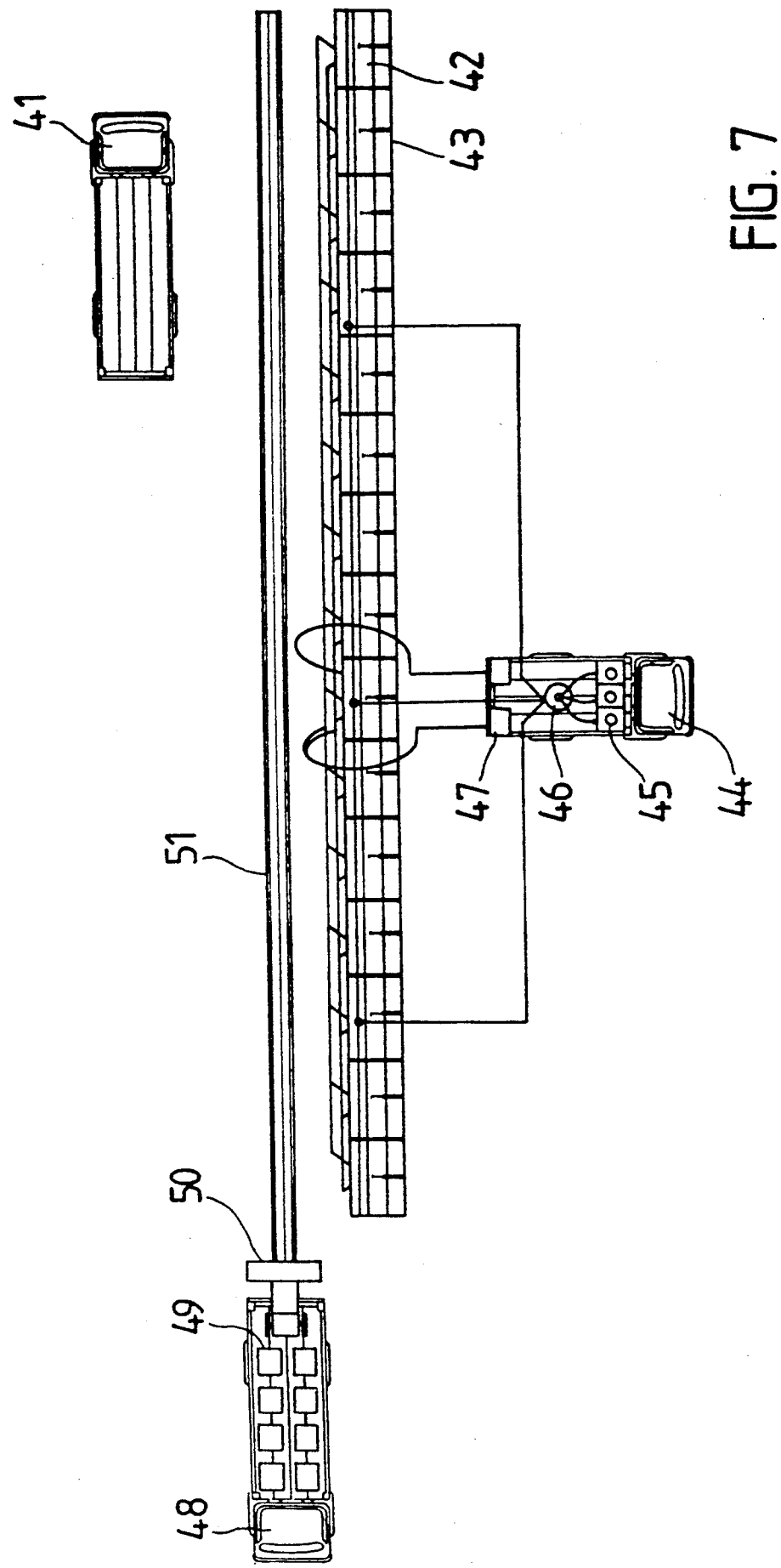
Figure 8:
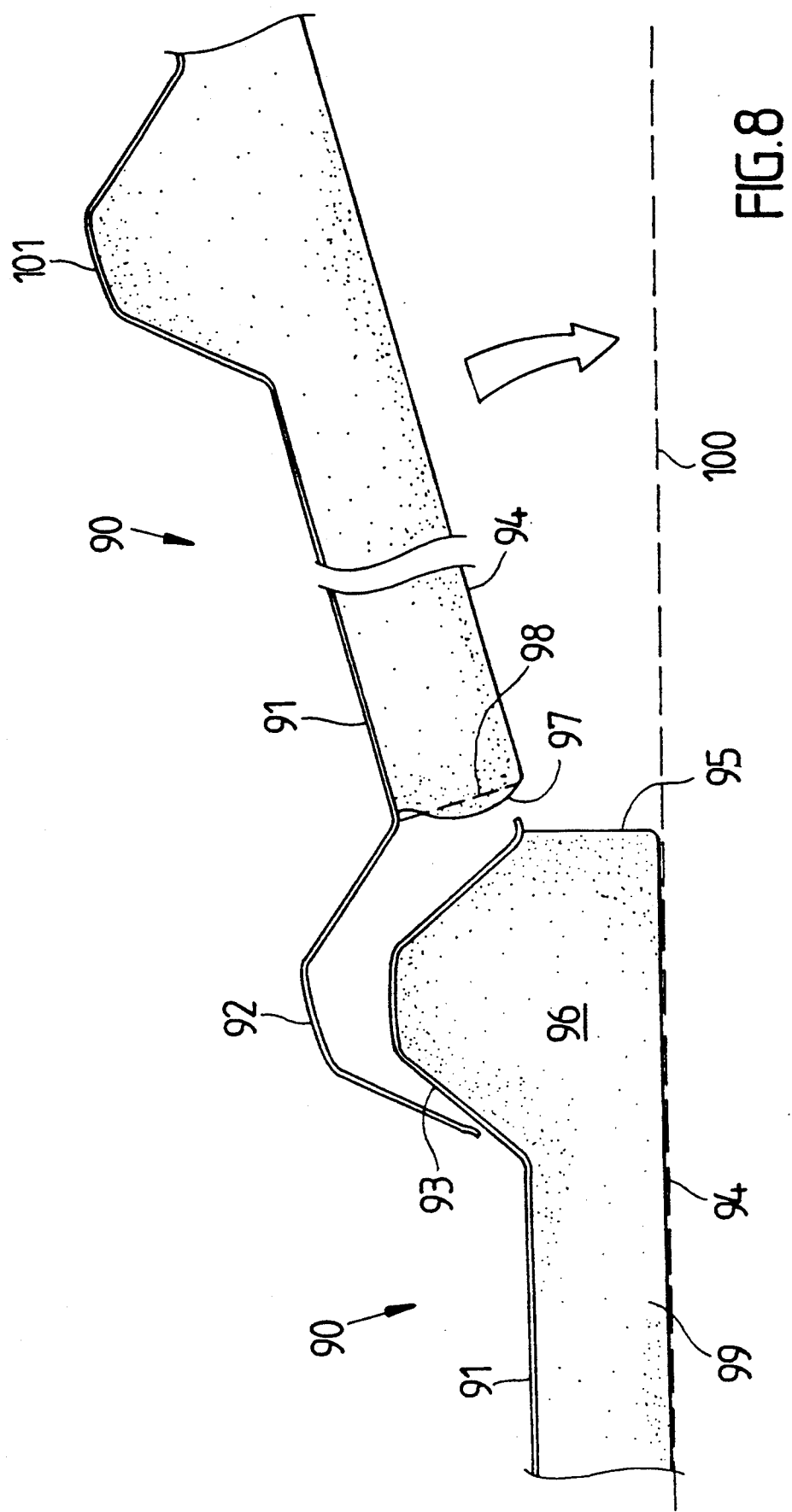
Figure 9:
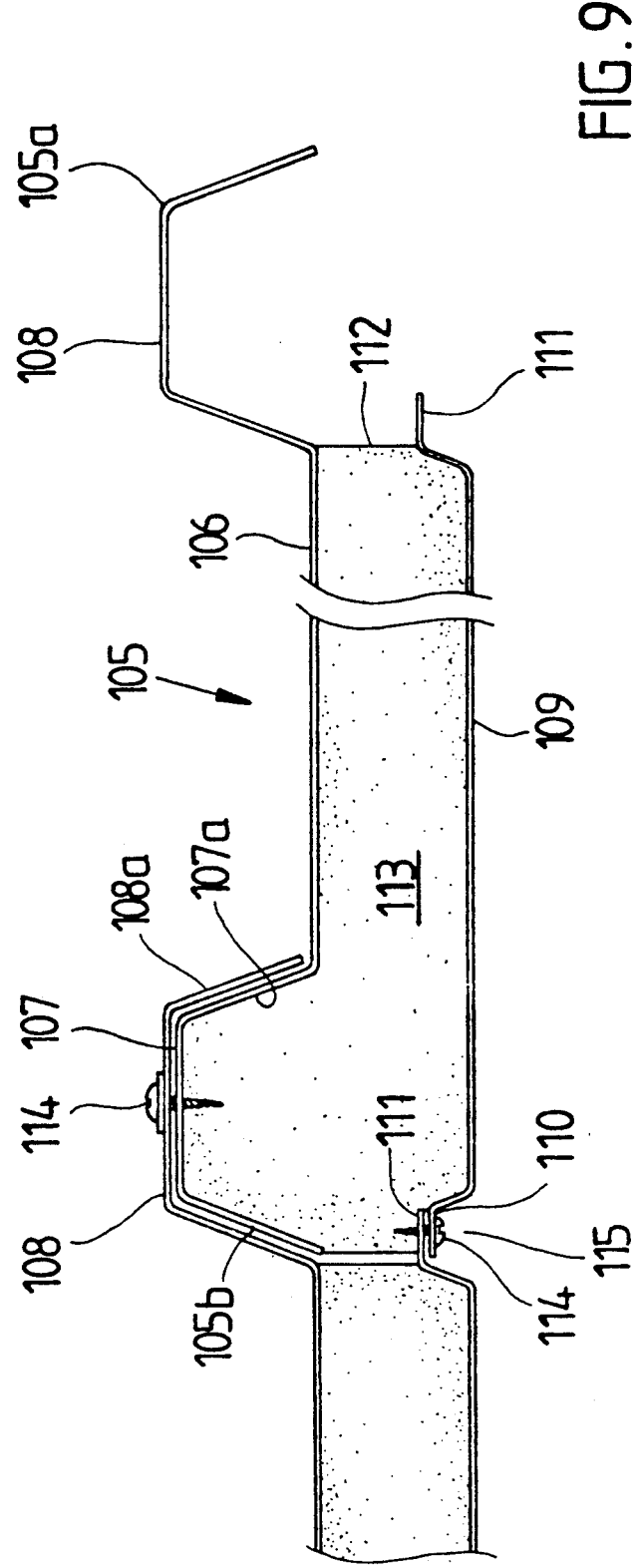

FIG. 4 snows the arrangement of FIGS 1 and 2 in a support cradle;

FIG. 5 shows an alternative view of FIG. 4;

FIG. 6 shows an enlarged part cross sectional view of the arrangement of FIG. 5;

FIG. 7 shows schematically a mobile panel manufacturing system;

FIG. 8 shows one form of joint between panels according to the invention;

FIG. 9 shows another form of joint;

FIG 10 shows cross sections of various panels made in accordance with the invention.

FIG 1 is a press module comprising a fixed platen 1 and a movable platen 2. Platens 1 and 2 comprise planar steel platen surfaces 3 and 4 respectively and the platen surfaces 3 and 4 are reinforced against distortion by reinforcing members 5 and 6 respectively. Reinforcing members 5 and 6 may comprise steel angle sections or box sections.

Fixed platen 1 is mounted on a support base 7 and movable platen 2 is hingedly mounted about pivots 8 on support members 9 slidably located in base 7. On the free ends of support members 9 are brackets 10 connectable to an adjustment mechanism (not shown) to adjust the spacing between platen surfaces 3 and 4. Also not shown (for the purpose of clarity) are clamp members connectable between the upper portions of platens 1 and 2.

FIG. 2 shows the arrangement of FIG 1 in an extended position for the manufacture of thicker panels.

Figure 3:
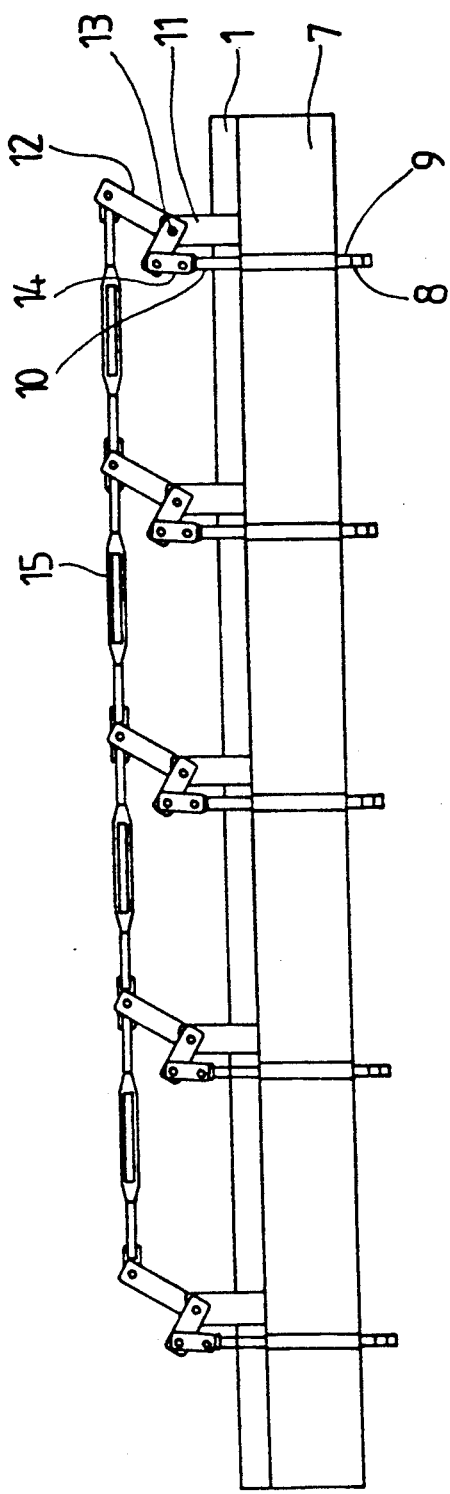
FIG 3 shows a top plan view of portion of the arrangement of FIGS 1 and 2.

FIG. 3a and FIG. 3b are plan views of platen 1 and base 2 showing an adjustment mechanism for adjusting the space between platen surfaces 3 and 4.

FIG. 3a shows the mechanism in a retracted position and FIG. 3b shows the mechanism in an extended position.

Mounted on the lower edge of platen 1 are brackets 11 pivotally supporting crank arms 12 pivotable about pivots 13. Pivotally connected to one arm of cranks 12 are links 14 pivotally connected to brackets 10 on the free ends of support members 9. On the other arm of cranks 12 are pivotally mounted adjustable links 15 each connected at opposing ends to adjacent crank arms. Actuation of crank arms 12 in unison is effected by a mechanical means such as a lever, electro mechanical means such as an electric motor/gearbox assembly or preferably by a fluid powered ram.

The press module shown in FIGS 1 and 2 suitably has a platen dimension of 3.3 meters in length and 1 meter in width. The adjustment means enables the spacing between the platens to be adjusted from say 10 mm to say 400 mm although most panels likely to be produced would have a thickness of between 50 mm and 100 mm.

FIG 4 snows an alternative embodiment of the apparatus of FIGS 1 and 2. As described later it is preferred that the formation of a foamed plastics core from liquid plastics materials is carried out on an incline. Accordingly means are required to enable the press to be tilted if required to an angle of inclination to suit the circumstances. As it is preferred that the modular presses are transportable for on-site erection it is preferred that an angularly adjustable support means is associated with each press.

FIG. 4 shows schematically a support cradle for a press. The cradle comprises a base 20 with an upright support member 21. Mounted on the base 20 are brackets 22 upon which are pivotally mounted tiltable support members 23 supporting the press assembly 24. The support members 23 are slidably located in apertures (not shown in base member 7 to enable removal of the press assembly 24 from support cradle if required. The press assembly 24 is secured to the support members 23 by any suitable means such as grab screws or the like (not shown). Tiltable support members 23 are supported at a required angle of inclination by arms 25 pivotably attached to base 20 by pivots 26. A removable pin 27 in the form of a nut and bolt assembly extending through an aperture 28 in support member 23 secures the press assembly at a required angle of inclination. Adjustable levelling means 20a are provided for the purpose of levelling the press, particularly in the longitudinal direction to ensure even distribution of liquid polyurethane.

For transportation purposes, the press assembly may be removed from the cradle or alternatively it may be transported in an upright position on the cradle. For upright use or transportation a support pad 29 supports the mass of the press assembly 24 on base 20.

FIG. 4 shows the press assembly in an inclined position with movable platen 2 in a closed position and also in an open position shown at 2a. Platen 2 is moved between an open and closed position by hydraulic rams (not shown) extending between base 20 and movable platen 2.

FIG. 5 shows a partial view of the assembly of FIG. 4 with a clamp assembly 30 connected between the upper ends of platens 1 and 2. The clamp assembly comprises a plurality of spaced jaw members 31 actuable in unison by a lever and crank assembly 32 similar to that illustrated in FIG. 3. Suitably the crank assembly 32 is actuable by a fluid powered ram (not shown).

In use the press assembly is opened and a sheet of outer skin facing material (such as asbestos cement sheet, plywood, reconstituted timber sheeting, flat steel sheet, profiled steel sheet, rigid plastics sheet or flexible metal or plastics films or various combinations of outer skins) is supported against each of platen faces 1 and 2. Rigid sheet materials are generally self supporting and may rest on the upper surface of base 7 or upon a removable edge profiling strip (not shown). For flexible films, platen surfaces 1 and 2 may include a plurality of fine perforations communicating with a plenum chamber on the outer sides of the platen surfaces. The plenum chamber is connected to a vacuum pump and the air space between the film and the platen surface is evacuated to retain the film in place against the platen surface.

After positioning the outer skin materials against respective platen surfaces, mould closure members are then spaced about the periphery of the sheets of skin materials. As previously indicated these may be removable seals such as timber members covered with plastic release film, or they may form edge portions of the completed panel.

The mould sealing members may, if required, include a profiled shape to facilitate edge to edge joining of finished panels.

After the mould sealing members are positioned, the press is closed and the clamp assembly 30 is actuated to retain the platen surfaces at a predetermined spacing determined by the thickness of the mould sealing members and the thickness adjustment assembly 33.

An upper or side edge sealing member (not shown) includes one or more gas evacuation and injection ports communicating with the hollow space between the outer skin sheets. Heating elements associated with the platen surfaces are switched on to achieve a temperature of between say 30–50 degrees C and this also preheats the outer skin materials. A nozzle of a conventional polyurethane mixing/injecting gun is then inserted into the injection port (or ports) and a predetermined volume of liquid polyurethane and foaming agent is injected into the cavity. The port (or ports) is then sealed and the polyurethane mixture is allowed to expand to fill the cavity. When the polyurethane foam core has cured sufficiently, the press is opened by releasing the clamp assembly and then actuating the thickness adjustment assembly 33 to "crack" any air tight seal which may form between the outer skins and respective platen surfaces. The hydraulic ram assembly associated with the movable platen is then retracted to open the press to enable removal of the finished panel. Any removable mould closure members are then removed from the peripheral edges of the panel.

Foam cored panels made according to the invention may employ conventional profiled steel roofing panels on at least one side of a finished panel. A typical foam cored panel for use in roofing or walling of, say a warehouse, cold store or the like may comprise a profiled steel panel for exposure to weather and a thin aluminium foil on an inner side to act as a thermal and moisture barrier.

The present invention enables these outer skin materials to be handled readily by the arrangement shown generally in FIG. 4.

The aluminium foil sheet is positioned on the movable platen 2 in the open position shown at 2a and is retained in position by evacuating the air space between the foil and the platen surface. The profiled steel sheet is positioned against platen 1 in the inclined position and the press is closed as previously described.

When the liquid polyurethane/foaming agent mixture is first injected it collects as a pool in the bottom of the mould cavity. As expansion commences, the fluid frothy mixture flows upwardly through the mould cavity progressively filling the longitudinal chambers in the profiled steel sheet. By inclining the press as shown, voids which might otherwise be formed in the longitudinal channels of a vertically oriented press are thus avoided.

By placing a pluralitY of press modules in end to end abutting alignment it is possible to manufacture foam cored panels of any desired length.

In view of the high cost of transportation of panels over long distances and the practical and legal limitations on the maximum length of panels for transportation, the present invention provides an elegant solution to these problems.

FIG. 6 shows an enlarged part cross sectional view of a press seal arrangement in the upper region of the press shown in FIG. 5.

An elongate seal 70 is formed from compressible or incompressible material such as synthetic rubber, timber or steel and, if required includes a contoured inner face 71 to form a complementary shaped contour in the upper edge of a panel (not shown) formed in the mould.

Seal 70 is mounted on spaced hollow injection nozzles 72 which extend through seal 70 for fluid communication with the interior of the press. Nozzles 72 include an attachment nipple 73 at their upper end for connection to a supply hose (not shown) for delivery of liquid foamable polyurethane.

Nozzles 72 are adjustably located on the respective ends of spaced pivotal arms 75 which are pivoted on brackets 76 attached to tiltable platens 2. A grub screw 77 or the like retains nozzles 72 in a desired position within the press to correspond with a predetermined width of panel.

Arms 75 are pivotable to retract seal 70 by means of link arms 78 pivotally connected to cranked arms 79, which in turn are pivotally mounted on bracket 80. Cranked arms 78 are connected by a linkage (not shown) such that all spaced arms 75 are pivotable in unison when the linked mechanism is actuated by a fluid powered cylinder 81.

Also located in seal 70 are spaced flexible vent tubes 82 which are connected to an exhaust manifold 83. Exhaust manifold 83 is maintained under reduced pressure to evaluate to a gas absorber or gas scrubber any toxic or noxious gases released during the foaming of the core material.

After the respective skin materials have been located in place on the exposed platen surfaces of the open press (shown generally in FIG. 4), cylinder 81 is actuated to locate seal 70 against the inner surface of platen 2. The press is then closed and when clamps 31 engage between platens and 2 seal 70 is sealingly clamped between the opposed inner platen surfaces.

After formation of the panel as previously described, clamps 31 are released and the press is opened before actuating cylinder 81 to retract seal 70, thereby releasing the panel for removal from the press. Towards the end of the foaming of the core material, a certain amount of the foam enters vent tubes 82 and cures therein. By careful judgement of foam shot size, the amount of penetration can be reduced to say 2–3 cm. To clear the vent tubes, the exposed ends 82a are grasped and a length of tube, say 4–5 cm, is drawn through seal 70 and then severed to remove the now blocked portion of the vent tubes 82.

FIG. 7 shows schematically a mobile panel manufacturing system which is capable of manufacturing on site panels of a length greater than could otherwise be legally or practically transported from a remote manufacturing centre.

The system requires typically three transport vehicles; vehicle 41 for transportation of modular press members 42 and supporting cradles 43; vehicle 44 including storage tanks 45 for polyol, di-isocyanate and foaming agent, mixing and injecting apparatus 46 and hydraulic pumps and electrical generators 47 for press operation; and vehicle 48 for transportation of rolls 49 of outer skin material and a roll former 50 for profiling steel outer skin material 51.

With the system depicted schematically in FIG. 6, the mobile vehicles can travel to remote sites and set up for manufacture very quickly.

The press modules 42 and their supporting cradles are set up and aligned in edge to edge abutting relationship on their support cradles 43. Respective hydraulic cylinders operating the clamp assembly 30, the thickness adjusting assembly 33 and the means for opening the press platens are connected via one or more conduits to an hydraulic pump on vehicle 44.

Vehicle 48 is adapted to dispense outer skin cladding material as planar webs and/or in a profiled form from a roll forming apparatus 50 associated with vehicle 48.

In the schematic arrangement shown, fifteen modular presses, each having a platen area of 3.3 meters in length and 1 meter in width are abutted and operatively interconnected to produce panels having a thickness of say from 25 mm to 160 mm and a length of up to about 50 meters.

On site production of large foam cored panels provides substantial cost savings in building construction due to:

1. Reduced transportation costs of finished panels.
2. Reduced manufacturing costs of panels.
3. Reduced costs of building support structure arising from structural integrity of unjoined panels.
4. Costs of fixing and weather proofing of end joins avoided entirely.
5. Limited time required to set up and dismantle manufacturing system.
6. Low operating overheads of a mobile system compared with that of a factory based system.
7. Substantially lower capital cost of equipment compared with prior art press apparatus.

FIG. 8 shows a preferred form of panel construction and joint.

The panel 90 comprises an outer skin of profiled steel roofing panel 91 having respectively on opposed edges an upper engaging ridge 92 and a complementary lower engaging ridge 93. The inner skin 94 is formed from a polyester film laminated to an aluminium foil. The exposed edge 95 of the foamed polyurethane core 96 associated with lower engaging ridge 93 is generally upright whereas the exposed edge 97 on the opposite site of the panel projects as a ridge beyond a face 98 which would otherwise correspond with edge 97 of an adjacent panel when connected.

After a first panel 99 is secured to a support surface 100, a second panel 101 is tilted so that upper and lower ridges 92,93 engage. A fixing means (not shown) such as a screw or the like is driven through the overlapping ridges 92,93 into the support surface. Pressure is then applied to the elevated edge of panel 101 to bring it into engagement with the support surface 100 to enable fixing thereto. As the elevated panel 101 pivots about its fixed free edge, the protruding face 97 compresses against adjacent face 95 to form a tight, waterproof seal.

FIG. 9 shows an alternative embodiment of a panel suited as an insulated lining in hygenic storage rooms such as cold stores for food.

The panel 105 comprises a profiled steel outer skin 106 having on opposed longitudinal edges outwardly extending engaging ridges 107,108. On the opposite faces of panel 105 is a steel inner skin 109 having on opposed edges an inwardly recessed planar flange 110,111.

One longitudinal edge 105a, of panel 105 is formed with ridge 108 and flange 111 extending from an exposed edge 112 of core material 113 whereas on the opposite edge 105b of panel 105, the cavity between ridge 107 and flange 110 is filled with core material Adjacent panels are joined by engaging free edge 108a of ridge 108 with an oppositely facing shoulder 107a of ridge 107 and forcing the adjacent edges of the panels into engagement whereby flange 111 severs the bond between the foam core and the inner surface of flange 110.

The panels are then secured together by fasteners 114 such as screws, rivets or the like.

The channel 115 formed between exposed faces of inner skins 109 is then filled with a sealant such as a silicone putty or a butyl mastic to seal and waterproof the joint and at the same time provide an easily cleaned surface free of crevices which could harbour bacteria, mould spores and the like.

FIG. 10 shows a selection from a wide variety of profiles which may be manufactured in accordance with the invention.

FIG 10a shows a fairly conventional profile showing a cold store insulating panel comprising a polyurethane foam core 60 sandwiched between planar sheets 61 of galvanized or painted steel.

FIG 10b shows a panel having profiled edges formed during the moulding process. One edge of the panel has a shaped spigot like projection 62 for engagement in a complementary socket like channel 63 in an adjacent panel. The panels when joined with a suitable adhesive form a moisture impervious integral structure.

FIG 10c shows a panel incorporating a reinforcing member comprising parallel steel trusses 64 held in spaced relationship by struts 65 welded or otherwise attached thereto. The polyurethane core material completely envelops the reinforcing structure during the expansion phase.

FIG 10d shows a panel comprising a profiled outer skin 66 and a planar skin 67. The foamed core material envelops a reinforcing member comprising a corrugated steel mesh panel 68.

FIG 10e shows a reinforced panel including a reinforcing member comprising opposed sheets of profiled steel sheet 69 forming hollow tubular channels 70 extending longitudinally of the panel. The webs 71 connecting the raised channels in the profiled sheet are apertured to permit fluid polyurethane to completely fill the spaces between adjacent channels 70. In this embodiment the liquid polyurethane is introduced by a plurality of elongate nozzles extending through corresponding ports in end mould closure members.

In a variation of the configuration shown in FIG 10e, the raised channels forming the channels 70 are also apertured to enable polyurethane foam to completely fill the spaces between the outer skins.

The invention is also directed to certain novel combinations in plastics foam cored panels.

In one aspect there is provided a structural member for floors, walls and the like comprising a foam cored panel having a reinforcing means located between the outer skins. A floor panel for example may comprise outer skins of asbestos cement sheet, a core of polyurethane foam and internal reinforcing comprising a metal framework such as a plurality of steel trusses or a profiled sheet of steel mesh.

In another aspect there is provided an insulating panel comprising a foam polyurethane core, and outer skin of profiled steel sheet and an inner skin of metallized polymer film such as aluminized Mylar (trade mark). The metallized polymer film provides a highly durable surface resistant to physical damage and it also provides a chemically resistant and moisture resistant barrier.

In view of the excellent bond strengths achievable between the polyurethane foam core and the outer skin materials the structural integrity of panels manufactured in acoordance with the invention enables reduced building construction costs. For example the flexural strength of a panel having at least one profiled steel skin is such that very long panels may be supported at their ends only without intermediate support from purlins in the case of walls or rafters in the case of roofs. The high bond strength between the core and outer skins means that thinner profiled metal sheets may be employed as the reinforcing ribs of the profile are supported against the buckling mode of failure.

Structural panels made in accordance with the invention are considered to be particularly suitable for construction of buildings in areas prone to earthquakes. This is because although the panels perform structurally well in a static condition, they possess sufficient flexibility to withstand considerable flexure without cracking as might occur with concrete panels.

I claim:

1. A portable apparatus for manufacture of foamed plastics laminated panels having at least one outer skin member, said apparatus comprising a press member including:

a pair of spaced relatively movable platen surfaces;
adjustment means to adjust spacing between said platen surfaces;
hinge means associated with at least one of said platen surfaces adjacent a longitudinal lower edge thereof;
clamp means to retain, in use, said platen surfaces in a predetermined spaced relationship;
sealing members locatable, in use, about and between peripheral opposed edges of said platen surfaces to define a hollow cavity between said opposed platen surfaces when said clamp means is actuated;
support means to support an outer skin member in a predetermined position against at least one of said opposed platen surfaces; and
a plurality of port means spaced along an upper sealing member to introduce into said cavity a liquid foamable plastics material; means to selectively support said press member with opposed platen surfaces in an upright or inclined position; and one or more gas venting ports associated with said upper sealing member to allow evacuation of air and other gasses during expansion of said foamable plastics material.

2. An apparatus as claimed in claim 1, wherein said press member is adapted for end abutment with one or more adjacent press members to form laminated panels of a predetermined length greater than the length of a platen surface of an individual press member.

3. An apparatus as claimed in claim 1, wherein said spaced relatively movable platen surfaces comprise a fixed platen surface and a hingeable platen surface.

4. An apparatus as claimed in claim 3, wherein said adjustment means comprises means to move said hinge means to selectively adjust spacing between said fixed platen surface and said hingeable platen surface.

5. An apparatus as claimed in claim 4, wherein said clamp means comprises a plurality of spaced clamps located adjacent upper edges of said fixed and hingeable platen surfaces.

6. An apparatus as claimed in claim 5, wherein one or both of said fixed and hingeable platen surfaces comprise a plurality of apertures fluidly connected to a source of reduced air pressure to support an outer skin member against said one or both of said fixed and hingeable platen surfaces.

7. An apparatus as claimed in claim 1, wherein said sealing member is pivotally connected to said hingeable platen surface and is selectively movable between a retracted position away from said platen surface and an extended position adjacent said platen surface.

8. A method of manufacture of laminated panels having a foamed plastics core and opposed outer skins of cladding material, said method comprising the steps of:

supporting a layer of outer skin material in said press member against a fixed platen surface;
supporting a layer of outer skin material in said press member against a hingeable opposed platen surface;
clamping said fixed and hingeable platen surfaces together in predetermined spaced relationship with peripheral sealing means therebetween defining a hollow cavity between respective said layers of outer skin material;
inclining said opposed platen surfaces;
injecting through a plurality of nozzles extending through an upper longitudinal sealing means a liquid foamable plastics composition which expands to fill said hollow cavity; and
removing said panel from said press after said foamed plastics core has substantially hardened.

9. A method as claimed in claim 8, wherein said liquid foamable plastics composition comprises expandable polyurethane.

10. A method as claimed in claim 8, wherein one of said outer skin materials comprises a profiled steel cladding.

11. A method as claimed in claim 8, wherein one of said outer skin materials comprises a laminate of aluminum foil and a flexible plastics material.

* * * * *